United States Patent
Sachs et al.

(10) Patent No.: US 6,360,313 B1
(45) Date of Patent: *Mar. 19, 2002

(54) INSTRUCTION CACHE ASSOCIATIVE CROSSBAR SWITCH

(75) Inventors: Howard G. Sachs, Los Altos; Siamak Arya, Cupertino, both of CA (US)

(73) Assignee: Intergraph Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,758

(22) Filed: Sep. 8, 2000

Related U.S. Application Data

(63) Continuation of application No. 09/057,861, filed on Apr. 9, 1998, which is a continuation of application No. 08/754,337, filed on Nov. 22, 1996, now Pat. No. 5,794,003, which is a continuation of application No. 08/498,135, filed on Jul. 5, 1995, now abandoned, which is a continuation of application No. 08/147,797, filed on Nov. 5, 1993, now abandoned.

(51) Int. Cl.[7] .................................................. G06F 9/38
(52) U.S. Cl. .................. 712/215; 712/24; 712/207; 712/213; 712/234
(58) Field of Search ........................... 712/23, 24, 208, 712/210, 211, 212, 213, 214, 215, 234, 207; 395/706

(56) References Cited

U.S. PATENT DOCUMENTS

| | | |
|---|---|---|
| 4,437,149 A | 3/1984 | Pomerene et al. |
| 4,833,599 A | 5/1989 | Colwell et al. |
| 4,847,755 A | 7/1989 | Morrison et al. |
| 4,933,837 A | 6/1990 | Freidin |
| 5,055,997 A | 10/1991 | Sluijter et al. |
| 5,057,837 A | 10/1991 | Colwell et al. |
| 5,081,575 A | 1/1992 | Hiller et al. |
| 5,101,341 A | 3/1992 | Circello et al. |
| 5,121,502 A | 6/1992 | Rau et al. |
| 5,129,067 A | 7/1992 | Johnson |
| 5,151,981 A | 9/1992 | Westcott et al. |
| 5,179,680 A | 1/1993 | Colwell et al. |
| 5,197,137 A | 3/1993 | Kumar et al. |
| 5,203,002 A | 4/1993 | Wetzel |
| 5,214,763 A | 5/1993 | Blaner et al. |

(List continued on next page.)

FOREIGN PATENT DOCUMENTS

| | | |
|---|---|---|
| EP | 0 363 222 A2 | 4/1990 |
| EP | 0 426 393 A2 | 5/1991 |
| EP | 0 449 661 A2 | 10/1991 |
| EP | 0463296 A2 | 1/1992 |

(List continued on next page.)

OTHER PUBLICATIONS

Adams et al., "HARP: A Statically Scheduled Multiple–Instruction–Issue Architecture and it Compiler", *Technical Report 163,* University of Hertfordshire, Hatfield, Herts UK, pp. 1–8, Sep. 1993.

Agerwala et al., "High Performance Reduced Instruction Set Processors", RC 12434 (#55845), *Computer Science,* Jan. 9, 1987.

(List continued on next page.)

Primary Examiner—Viet D. Vu
(74) Attorney, Agent, or Firm—Townsend&Townsend&Crew

(57) ABSTRACT

A computing system as described in which individual instructions are executable in parallel by processing pipelines, and instructions to be executed in parallel by different pipelines are supplied to the pipelines simultaneously. The system includes storage for storing an arbitrary number of the instructions to be executed. The instructions to be executed are tagged with pipeline identification tags indicative of the pipeline to which they should be dispatched. The pipeline identification tags are supplied to a system which controls a crossbar switch, enabling the tags to be used to control the switch and supply the appropriate instructions simultaneously to the differing pipelines.

122 Claims, 5 Drawing Sheets

U.S. PATENT DOCUMENTS

| | | |
|---|---|---|
| 5,226,169 A | 7/1993 | Gregor |
| 5,233,696 A | 8/1993 | Suzuki |
| 5,239,654 A | 8/1993 | Ing-Simmons et al. |
| 5,297,255 A | 3/1994 | Hamanaka et al. |
| 5,297,281 A | 3/1994 | Emma et al. |
| 5,299,321 A | 3/1994 | Iizuka |
| 5,333,280 A * | 7/1994 | Ishikawa et al. ............ 712/241 |
| 5,337,415 A | 8/1994 | DeLano et al. |
| 5,355,460 A | 10/1994 | Eickemeyer et al. |
| 5,367,694 A | 11/1994 | Ueno |
| 5,442,760 A * | 8/1995 | Rustad et al. ............... 712/215 |
| 5,459,844 A | 10/1995 | Eickemeyer et al. |
| 5,500,942 A | 3/1996 | Eickemeyer et al. |
| 5,761,470 A | 6/1998 | Yoshida |
| 5,819,088 A | 10/1998 | Reinders |
| 5,922,065 A | 7/1999 | Hull |

FOREIGN PATENT DOCUMENTS

| | | |
|---|---|---|
| EP | 0 463 299 A2 | 1/1992 |
| EP | 0 496 928 A2 | 8/1992 |
| EP | 0 652 510 A2 | 5/1995 |
| WO | WO 98/38791 | 9/1998 |

OTHER PUBLICATIONS

Allison, DEC 7000/10000 Model 600 AXP Multiprocessor Server, *IEEE*, 1063–6390/93, pp. 456–464 (1993).

Anderson, D.W. et al. [1967] "The IBM 360 model 91: Processor Philosophy and instruction handling." IBM J. Research and Development 11:1 (Jan.) pp. 8–24.

Arya et al., "An Architecture for High Instruction Level Parallelism", pp. 1–21, Jan. 1995.

Bakoglu et al., "The IBM RISC system/6000 processor: hardware overview", *IBM J. Res. Develop.*, 34(1):12–22 (Jan., 1990).

Beck et al., "The Cydra 5 Minisupercomputer: Architecture and Implementation", *J. Supercomputing*, 7:143–179 (1993).

Butler, et al., "Single Instruction Stream Parallelism Is Greater than Two", 1991 ACM, pp. 276–286.

Case et al., "DEC Enters Microprocessor Business With Alpha", *Microprocessor Report*, 6(3):1,6–14, (Mar. 4, 1992).

Chang et al., "Comparing Static and Dynamic Code Scheduling for Multiple–Instruction–Issue Processors", *Proceedings of the 24th International Symposium on Microarchitectures—MICRO24*, pp. 1–9, 1991.

Charlesworth, A.E., [1981]. "An approach to scientific processing: The architecture design of the AP–120B/FPS–164 family" Computer 14:9 (Sep.), pp. 18–27.

Chen, "The Effect of Code Expanding Optimizations on Instruction Cache Design",*IEEE Transactons on Computers*, 42(9) pp. 1045–1057, Sep. 1993.

Colwell, et al., "A VLIW Architecture for a Trace Scheduling Compiler",*IEEE Transactions on Computers*, 37(8) pp. 967–979, Aug. 1988.

Colwell, R.P. et al. [1987]. "A VLIW architecture for a trace scheduling compiler." Proc. second Conf. on Architectural Support for Programming Languages and Operating Systems, *IEFF/ACM* (Mar.), pp. 180–192.

Conte, "Trade–Offs in Processor/Memory Interfaces for Superscalar Processors", MICRO–25, *The 25th Annual International Symposium on Microarchitecture*, Dec. 1992.

De Gloria et al., "A Programmable Instruction Format Extension to VLIW Architectures", *Proceedings Comp. Euro. 1992*, pp. 35–40 (May 4, 1992).

Dehnert et al., "Compiling for the Cydra 5", *J. Supercomputing*, 7, pp. 181–227, May 1993.

Dehnert, J.C. et al. [1989]. "Overlapped loop support on the Cydra 5." Proc. Third Conf. on Architectural Support for Programming Languages and Operating Systems (Apr.), TEEE/ACM. Boston, pp. 26–39.

Dorozhevets et al., The El–Brus–3 and Mars–M: Recent Advances in Russian High–Performance Computing, *Journal of Supercomputing*, 6(1):5–48 (Mar. 1, 1992).

Dutton, "The Design of the DEC 3000 Model 500 AXP Workstation", *IEEE*, 1063–6390/93, pp. 449–455 (1993).

Fisher et al., "Instruction–Level Parallel Processing", *Science*, 253, pp. 1233–1241, Sep. 1991.

Fisher et al., "Parallel Processing: A Smart Compiler and a Dumb Machine", *SIGPLAN Notices*, 19(6):37–47 (Jun. 1984).

Fisher et al., "Parallel Processing: A Smart Compiler and a Dumb Machine", *ACM–Sigplan 84 Compiler Construciton Conference*, 19(6), Jun. 1984.

Fisher, "Trace Scheduling: A Technique for Global Microcode Compaction", *IEEE Transactions on Computers*, C–30(7):478–490 Jul. 1981.

Fisher, "Very Long Instruction Word Architectures and the ELI–512", *Proceedings of the 10th Symposium on Computer Architecture*, ACM Press, pp. 140–150 (1983).

Gee et al., "Cache Performance of the SPEC92 Benchmark Suite", *IEEE MICRO*, pp. 17–27, Aug. 1993.

Gray et al., "Static Instruction Scheduling for the HARP Multiple–Instruction–Issue Architecture", *Technical Report 142*, University of Hertfordshire, Hatfield, Herts UK, Oct. 1992.

Grove et al., "GEM Optimizaing Compilers for Alpha AXP Systems", *IEEE*, 1063–6390/93, pp. 464–473 (1993).

Gwennap, "Visionaries See Beyond Superscalar", *Microprocessor Report*, pp. 18–19, Dec. 6, 1993.

Hennessy et al., "Computer Architecture; a Quantitative Approach", ISBN 1–55880–069–8, Morgan Kaufmann Publishers, Inc., San Mateo Calif. (1990) Table of Contents, pp. xi–xv.

Hennessy et al., "Computer Technology and Architecture: An Evolving Interaction", *IEEE Computer*, pp. 18–29, Sep. 1991.

Hsu et al., "Highly Concurrent Scalar Processing", *13th International Symposium on Computer Architecture*, pp. Tokyo, 1986, pp. 1–10.

Johnson, "Superscalar Microprocessor Design", Prentice–Hall 1991 pp. 233–235.

Johnson, "Superscalar Microprocessor Design", Prentice–Hall, Englewood Cliffs, New Jersey, 1991.

Karl, "Some Design Aspects for VLIW Architectures Exploiting Fine–Grained Parallelism", *Proceedings of the 5th International PARLE Conference*, pp. 582–599, Jun. 1993.

Kato et al., "Delayed Instruction Execution on a Long Instruction Word (LIW) Computer", *Systems & Computers in Japan*, 23(14):13–22 (Jan. 1, 1992).

Lam et al., "Limits of Control Flow on Parallelism", *Computer Architecture News*, 20(2):46–57 (1992).

Lam, "Software Pipelining: An Effective Scheduling Technique for VLIW Machines", *Proceedings of ACM SIGPLAN '88 Conference on Programming Language Design and Implementation,* pp. 318–328, Jun. 1988.

Mahlke et al., "Effective Compiler Support for Predicated Execution Using the Hyperblock", MICRO 25, *Proceedings of the 25$^{th}$ Annual International Symposium on Microarchitectures,* IEEE Computer Society Press, pp. 45–54, Dec. 1992.

Mahlke et al., "Sentinel Scheduling for VLIW and Superscalar Processors", *In Proceedings of ASPLOS V,* 27(9) pp. 238–247, Sep. 1992.

Minagawa et al., "Pre–decoding Mechanism for Superscalar Architecture", *IEEE Pacific Rim Conference on Communications, Computers and Signal Processing,* pp. 21–24 (May 9, 1991).

Moon et al., "An Efficient Resource–Constrained Global Scheduling Technique for Superscalar and VLIW Processors", MICRO 25, *Proceedings of the 25$^{th}$ Annual International Symposium on Microarchitectures,* pp. 55–71, Dec. 1992.

Nicolau et al., "Measuring the Parallelism Available for Very Long Instruction Word Architectures", *IEEE Transactions on Computers,* C–33(11), pp. 968–976, Nov. 1984.

Oyang et al., "A Cost Effective Approach to Implement A Long Instruction Word Microprocessor", *Computer Architecture News,* 18(1), Mar. 1990, pp. 59–72.

Pan et al., "Improving the Accuracy of Dynamic Branch Prediction Using Branch Correlation", *Fifth International Conference on Architectural Support for Programming Languages and Operating Systems* (ASPLOS–V), vol. 27, pp. 76–84 (1992).

Park et al., "On Predicated Execution", *Technical Report HPL–91–58,* Hewlett–Packard Laboratories May 1991.

Rau et al., "Efficient Code Generation for Horizontal Architectures: Compiler Techniques and Architectural Support", *Proceedings of the Ninth Annual International Symposium on Computer Architecture,* pp. 131–139, 1982.

Rau et al., "Instruction–Level Parallel Processing: History, Overview and Perspective", *J. Supercomputing,* vol. 7, pp. 9–50 (1993).

Rau, "Cydra™ 5 Directed Dataflow Architecture", *Proceedings of COMPCON* 1988.

Rau, "Dynamic Scheduling Techniques for VLIW Processors", *Technical Report HPL–93–52,* Hewlett–Packard Laboratories, Jun. 1993.

Rau, B.R., et al. [1989]. "The Cydra 5 departmental supercomputer: Design philosophies, decisions, and tradeoffs," IEEE Computers, 22:1 (Jan.), pp. 12–34.

Rau, et al. (Editors), "Instruction–Level Parallelism", reprint from *J. Supercomputing,* 7(1/2), 1993.

Schuette et al., "Instruction–Level Experimental Evaluation of the Multiflow Trace 14/300 VLIW Computer", *J. Supercomputing,* vol. 7, pp. 249–271 (1993).

Silberman et al, "An Architectural Framework for Supporting Heterogeneous Instruction–Set Architectures", *IEEE Computer,* 26(6), pp. 39–56, Jun. 1993.

Sites (Editor), "Alpha Architecture Reference Manual", Digital Press 1992.

Smith et al., "Boosting Beyond Static Scheduling in a Superscalar Processor", *IEEE Computer,* pp. 344–353, 1990.

Smith, J.E. [1989]. "Dynamic instruction scheduling and the astronautics ZS–I" Computer 22:7 (Jul.), pp. 21–35.

Smith, J.E. et al. [1987]. "The ZS–I central processors," Proc. Second Conf. on Architectural Support for Programming Languages and Operating Systems, IEEE/ACM (Mar.), pp. 199–204.

Sohi and Vajapeyam [1989]. "Tradeoffs in instruction format design for horizontal architectures," Proc. Second Conf. on Architectural Support for Programming Languages and Operating Systems, IEEE/ACM (Apr.), pp. 15–25.

Sohi, G.S. [1990]. "Instruction issue logic for high–performance, interruptible, multiple functional unit pipelined computers," IEEE Trans. on Computers 39:3 (Mar.), 349–359.

Steven et al., "An Evaluation of the iHARP Multiple–Instruction–Issue Processor", Division of Computer Science, Univ. of Hertfordshire, Hatfield, Hertfordshire, pp. 1–8, Sep. 1995.

Stevens et al., "iHARP: A Multiple Instruction Issue Processor", *Technical Report No. 125,* Hatfield Polytechnic, Nov. 1991.

Stevens, "An introduction to the Hatfield Superscalar Scheduler", *Technical Report No. 316,* University of Herfordshire, Hatfield, Herts UK, Spring 1998.

Stone et al., "Computer Architecture in the 1990s", *IEEE Computer,* pp. 30–37, Sep. 1991.

The SPARC Architecture Manual, Version 8, Prentice Hall, New Jersey, 1992.

Tjaden et al., "Detection and Parallel Execution of Parallel Instructions", *IEEE Transactions On Computers,* C–19(10):889–895 Oct. 1970.

Tomasulo, R.M. [1967], "An efficient algorithm for exploiting multiple arithmetic units," IBM J. Research and Development 11:1 (Jan.), 25–33.

Uht, "Extraction of Massive Instruction Level Parallelism", *Computer Architecture News,* 21(3):5–12, Jun. 1993.

Wall, "Limits of Instruction Level Parallelism", *Proceedings of the Fourth International Conference on Architectural Support for Programming Languages and Operation Systems,* pp. 176–188, Apr. 1991.

Warter et al., "Enhanced Modulo Scheduling for Loops With Conditional Branches", MICRO 25, *Proceedings of the 25$^{th}$ Annual International Symposium on Microarchitecture,* pp. 170–179 (1992).

Warter et al., "The Benefit of Predicated Execution for Software Pipelining", *HICSS–26 Conference Proceedings,* vol. 1, pp. 497–506, Jan. 1993.

Weaver et al. (Editors), "The SPARC Architecture Manual—Version 9", SPARC International Inc., PTR Prentice Hall, Englewood Cliffs, New Jersey, 1994.

Weiss and Smith [1984]. "Instruction issue logic for pipelined supercomputers," Proc. 11th Symposium on Computer Architecture (Jun.) pp. 110–118.

Horst et al., "Multiple Instruction issue in the Nonstop cyclone processor" Proceedings of the 17th Annual International Symposium on Computer Architecture, IEEE Computer Society Press, WAshington, (May 28–31, 1990) pp. 216–226.

Requa et al., "The Piecewise data flow archtiecture: Architectural concepts" IEEE Transaction on Computers (1983) C–32(5):425–438.

Wang et al., "I–NET mechanism for issuing multiple instructions"Proceedings of Supercomputing IEEE Computer Society (Nov. 14–18, 1988) Orlando, FL., pp. 88–95.

\* cited by examiner

INSTRUCTION CACHE ASSOCIATIVE CROSSBAR SWITCH

CROSS-REFERENCES TO RELATED APPLICATIONS

This application is a continuation of application Ser. No. 09/057,861 filed Apr. 9, 1998, now pending; which is a continuation of application Ser. No. 08/754,337 filed Nov. 22, 1996, which issued as U.S. Pat. No. 5,794,003 on Aug. 11, 1998; which is a continuation of application Ser. No. 08/498,135 filed Jul. 5, 1995, now abandoned; which is a continuation of application Ser. No. 08/147,797 filed Nov. 5, 1993, now abandoned; the disclosures of which are incorporated by reference for all purposes.

This application also incorporates by reference for all purposes application Ser. No. 08/422,753 filed Apr. 13, 1995, which issued as U.S. Pat. No. 5,560,028 on Sep. 24, 1996; which is a continuation of application Ser. No. 08/147,800 filed Nov. 5, 1993, now abandoned.

BACKGROUND OF THE INVENTION

This invention relates to the architecture of computing systems, and in particular to an architecture in which individual instructions may be executed in parallel, as well as to methods and apparatus for accomplishing that.

A common goal in the design of computer architectures is to increase the speed of execution of a given set of instructions. One approach to increasing instruction execution rates is to issue more than one instruction per clock cycle, in other words, to issue instructions in parallel. This allows the instruction execution rate to exceed the clock rate. Computing systems that issue multiple independent instructions during each clock cycle must solve the problem of routing the individual instructions that are dispatched in parallel to their respective execution units. One mechanism used to achieve this parallel routing of instructions is generally called a "crossbar switch."

In present state of the art computers, e.g. the Digital Equipment Alpha, the Sun Microsystems SuperSparc, and the Intel Pentium, the crossbar switch is implemented as part of the instruction pipeline. In these machines the crossbar is placed between the instruction decode and instruction execute stages. This is because the conventional approach requires the instructions to be decoded before it is possible to determine the pipeline to which they should be dispatched. Unfortunately, decoding in this manner slows system speed and requires extra surface area on the integrated circuit upon which the processor is formed. These disadvantages are explained further below.

SUMMARY OF THE INVENTION

We have developed a computing system architecture that enables instructions to be routed to an appropriate pipeline more quickly, at lower power, and with simpler circuitry than previously possible. This invention places the crossbar switch earlier in the pipeline, making it a part of the initial instruction fetch operation. This allows the crossbar to be a part of the cache itself, rather than a stage in the instruction pipeline. It also allows the crossbar to take advantage of circuit design parameters that are typical of regular memory structures rather than random logic. Such advantages include: lower switching voltages (200–300 milliamps rather than 3–5 volts); more compact design, and higher switching speeds. In addition, if the crossbar is placed in the cache, the need for many sense amplifiers is eliminated, reducing the circuitry required in the system as a whole.

To implement the crossbar switch, the instructions coming from the cache, or otherwise arriving at the switch, must be tagged or otherwise associated with a pipeline identifier to direct the instructions to the appropriate pipeline for execution. In other words, pipeline dispatch information must be available at the crossbar switch at instruction fetch time, before conventional instruction decode has occurred. There are several ways this capability can be satisfied: In one embodiment this system includes a mechanism that routes each instruction in a set of instructions to be executed in parallel to an appropriate pipeline, as determined by a pipeline tag applied to each instruction during compilation, or placed in a separate identifying instruction that accompanies the original instruction. Alternately the pipeline affiliation can be determined after compilation at the time that instructions are fetched from memory into the cache, using a special predecoder unit.

Thus, in one implementation, this system includes a register or other means, for example, the memory cells providing for storage of a line in the cache, for holding instructions to be executed in parallel. Each instruction has associated with it a pipeline identifier indicative of the pipeline to which that instruction is to be issued. A crossbar switch is provided which has a first set of connectors coupled to receive the instructions, and a second set of connectors coupled to the processing pipelines to which the instructions are to be dispatched for execution. Means are provided which are responsive to the pipeline identifiers of the individual instructions in the group supplied to the first set of connectors for routing those individual instructions onto appropriate paths of the second set of connectors, thereby supplying each instruction in the group to be executed in parallel to the appropriate pipeline.

In a preferred embodiment of this invention the associative crossbar is implemented in the instruction cache. By placing the crossbar in the cache all switching is done at low signal levels (approximately 200–300 millivolts). Switching at these low levels is substantially faster than switching at higher levels (5 volts) after the sense amplifiers. The lower power also eliminates the need for large driver circuits, and eliminates numerous sense amplifiers. Additionally by implementing the crossbar in the cache, the layout pitch of the crossbar lines matches the pitch of the layout of the cache.

DESCRIPTION OF THE SPECIFIC EMBODIMENTS

Figure 1:
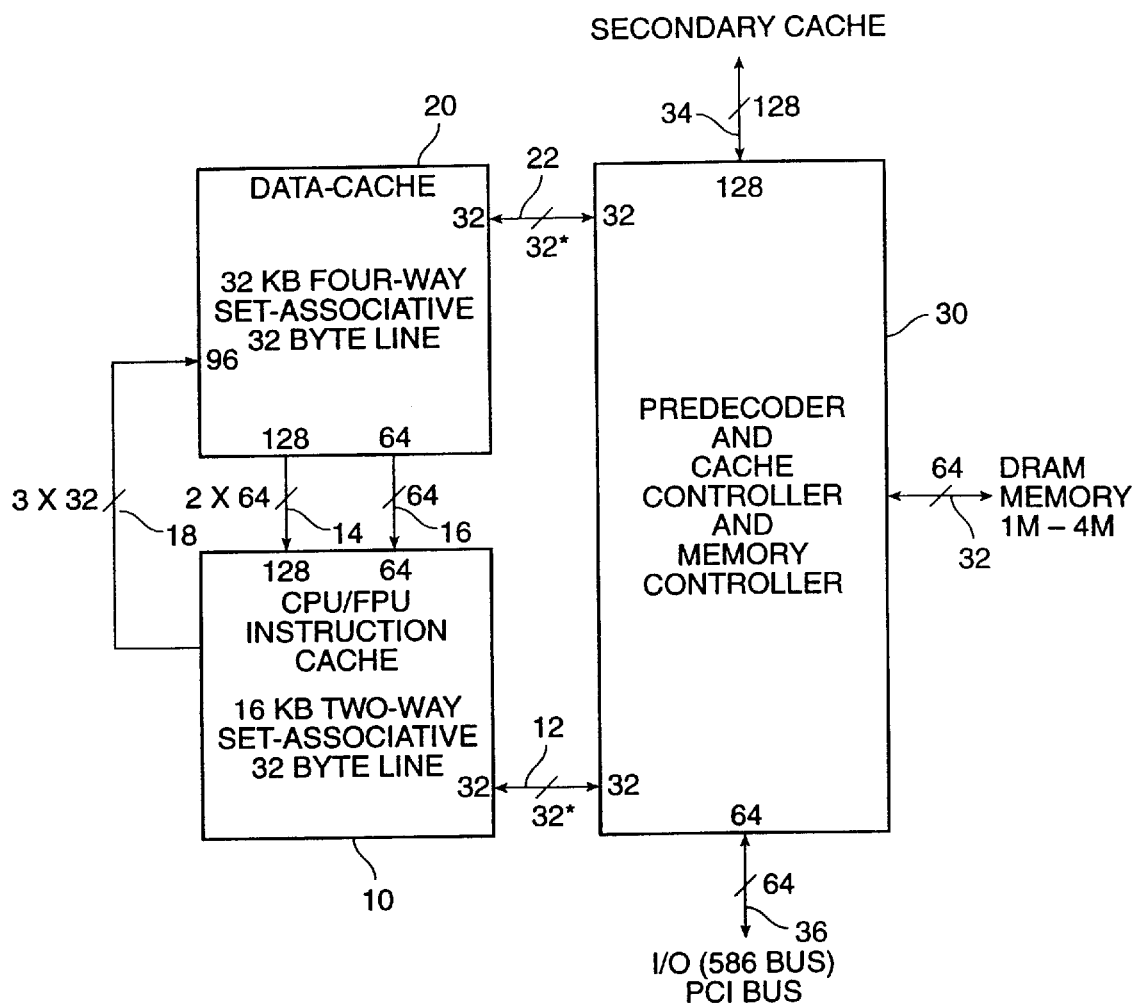
FIG. 1 is a block diagram illustrating a typical environment for a preferred implementation of this invention.

FIG. 1 is a block diagram of a computer system incorporating the associative crossbar switch according to the preferred embodiment of this invention. The following briefly describes the overall preferred system environment within which the crossbar is incorporated. For additional information about the system, see application Ser. No.

08/422,753 filed Apr. 13, 1995, which issued as U.S. Pat. No. 5,560,028 on Sep. 24, 1996; which is a continuation of application Ser. No. 08/147,800 filed Nov. 5, 1993, now abandoned, and entitled "Software Scheduled Superscaler Computer Architecture," which is incorporated by reference herein. FIG. 1 illustrates the organization of the integrated circuit chips by which the computing system is formed. As depicted, the system includes a first integrated circuit 10 that includes a central processing unit, a floating point unit, and an instruction cache.

In the preferred embodiment the instruction cache is a 16 kilobyte two-way set-associative 32 byte line cache. A set associative cache is one in which the lines (or blocks) can be placed only in a restricted set of locations. The line is first mapped into a set, but can be placed anywhere within that set. In a two-way set associative cache, two sets, or compartments, are provided, and each line can be placed in one compartment or the other.

The system also includes a data cache chip 20 that comprises a 32 kilobyte four-way set-associative 32 byte line cache. The third chip 30 of the system includes a predecoder, a cache controller, and a memory controller. The predecoder and instruction cache are explained further below. For the purposes of this invention, the CPU, FPU, data cache, cache controller and memory controller all may be considered of conventional design.

The communication paths among the chips are illustrated by arrows in FIG. 1. As shown, the CPU/FPU and instruction cache chip communicates over a 32 bit wide bus 12 with the predecoder chip 30. The asterisk is used to indicate that these communications are multiplexed so that a 64 bit word is communicated in two cycles. Chip 10 also receives information over 64 bit wide buses 14, 16 from the data cache 20, and supplies information to the data cache 20 over three 32 bit wide buses 18. The predecoder decodes a 32 bit instruction received from the secondary cache into a 64 bit word, and supplies that 64 bit word to the instruction cache on chip 10.

The cache controller on chip 30 is activated whenever a first level cache miss occurs. Then the cache controller either goes to main memory or to the secondary cache to fetch the needed information. In the preferred embodiment the secondary cache lines are 32 bytes and the cache has an 8 kilobyte page size.

The data cache chip 20 communicates with the cache controller chip 30 over another 32 bit wide bus. In addition, the cache controller chip 30 communicates over a 64 bit wide bus 32 with the DRAM memory, over a 128 bit wide bus 34 with a secondary cache, and over a 64 bit wide bus 36 to input/output devices.

As will be described further below, the system shown in FIG. 1 includes multiple pipelines able to operate in parallel on separate instructions which are dispatched to these parallel pipelines simultaneously. In one embodiment the parallel instructions have been identified by the compiler and tagged with a pipeline identification tag indicative of the specific pipeline to which that instruction should be dispatched.

In this system, an arbitrary number of instructions can be executed in parallel. In one embodiment of this system the central processing unit includes eight functional units and is capable of executing eight instructions in parallel. These pipelines are designated using the digits 0 to 7. Also, for this explanation each instruction word is assumed to be 32 bits (4 bytes) long.

As briefly mentioned above, in the preferred embodiment the pipeline identifiers are associated with individual instructions in a set of instructions during compilation. In the preferred embodiment, this is achieved by compiling the instructions to be executed using a well-known compiler technology. During the compilation, the instructions are checked for data dependencies, dependence upon previous branch instructions, or other conditions that preclude their execution in parallel with other instructions. The result of the compilation is identification of a set or group of instructions which can be executed in parallel. In addition, in the preferred embodiment, the compiler determines the appropriate pipeline for execution of an individual instruction. This determination is essentially a determination of the type of instruction provided. For example, load instructions will be sent to the load pipeline, store instructions to the store pipeline, etc. The association of the instruction with the given pipeline can be achieved either by the compiler, or by later examination of the instruction itself, for example, during predecoding.

Referring again to FIG. 1, in normal operation the CPU will execute instructions from the instruction cache according to well-known principles. On an instruction cache miss, however, a set of instructions containing the instruction missed is transferred from the main memory into the secondary cache and then into the primary instruction cache, or from the secondary cache to the primary instruction cache, where it occupies one line of the instruction cache memory. Because instructions are only executed out of the instruction cache, all instructions ultimately undergo the following procedure.

At the time a group of instructions is transferred into the instruction cache, the instruction words are predecoded by the predecoder 30. As part of the predecoding process, a multiple bit field prefix is added to each instruction based upon a tag added to the instruction by the compiler. This prefix gives the explicit pipe number of the pipeline to which that instruction will be routed. Thus, at the time an instruction is supplied from the predecoder to the instruction cache, each instruction will have a pipeline identifier.

It may be desirable to implement the system of this invention on computer systems that already are in existence and therefore have instruction structures that have already been defined without available blank fields for the pipeline information. In this case, in another embodiment of this invention, the pipeline identifier information is supplied on a different clock cycle, then combined with the instructions in the cache or placed in a separate smaller cache. Such an approach can be achieved by adding a "no-op" instruction with fields that identify the pipeline for execution of the instruction, or by supplying the information relating to the parallel instructions in another manner. It therefore should be appreciated that the manner in which the instruction and pipeline identifier arrives at the crossbar to be processed is somewhat arbitrary. I use the word "associated" herein to designate the concept that the pipeline identifiers are not required to have a fixed relationship to the instruction words. That is, the pipeline identifiers need not be embedded within the instructions themselves by the compiler. Instead they may arrive from another means, or on a different cycle.

Figure 2:
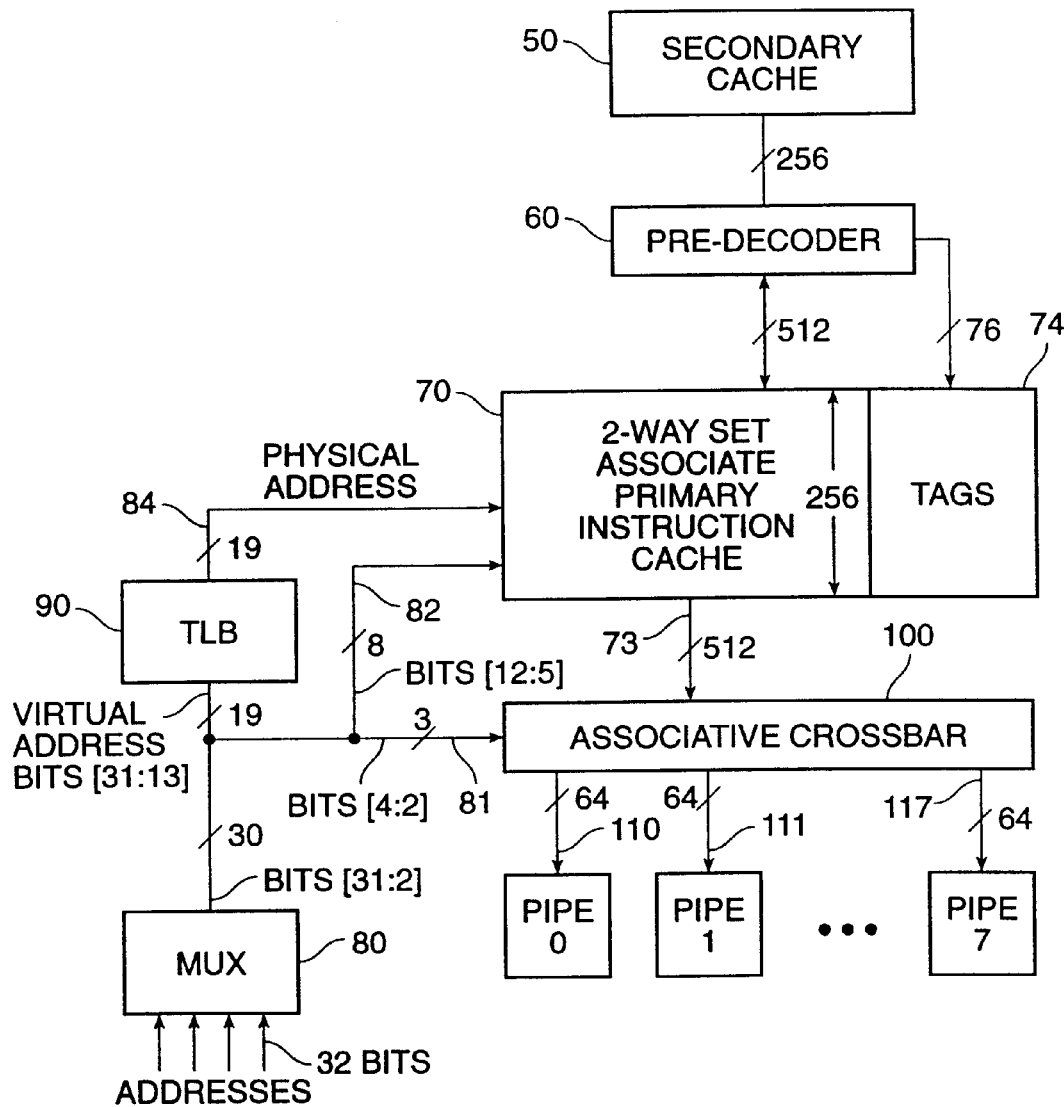
FIG. 2 is a diagram illustrating the overall structure of the instruction cache of FIG. 1.
Figure 3:
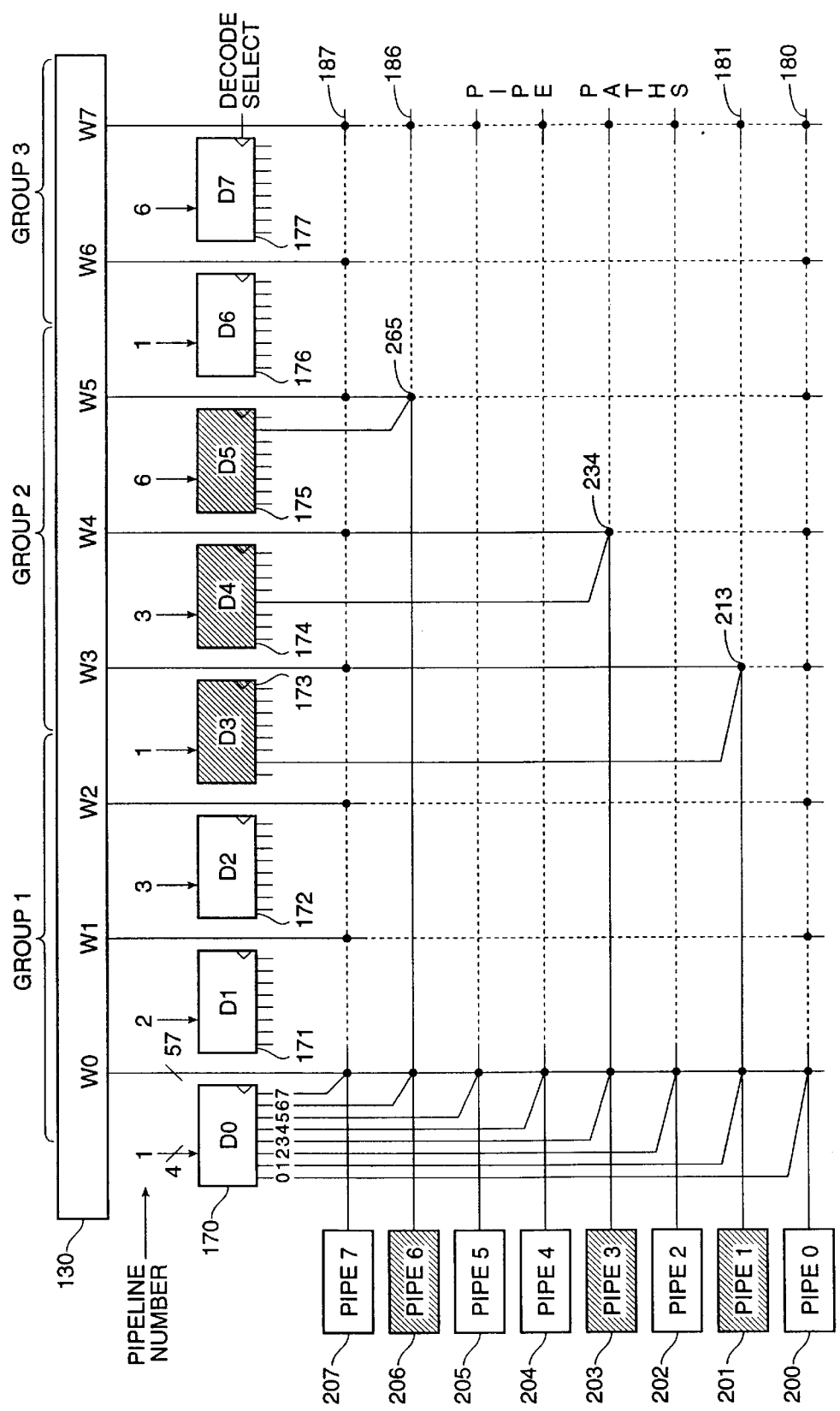
FIG. 3 is a diagram illustrating one embodiment of the associative crossbar.
Figure 4:
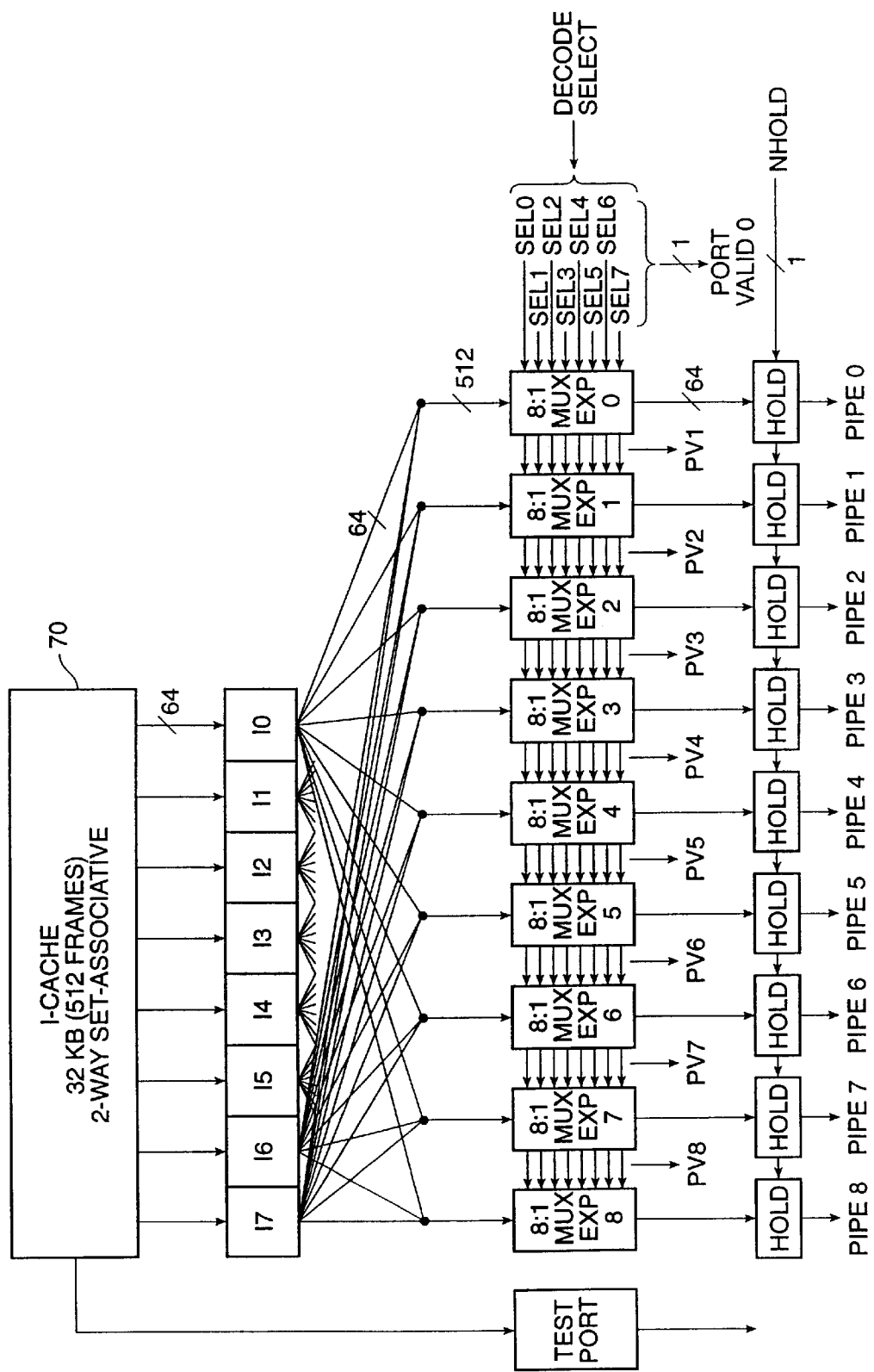
FIG. 4 is a diagram illustrating another embodiment of the associative crossbar.
Figure 5:
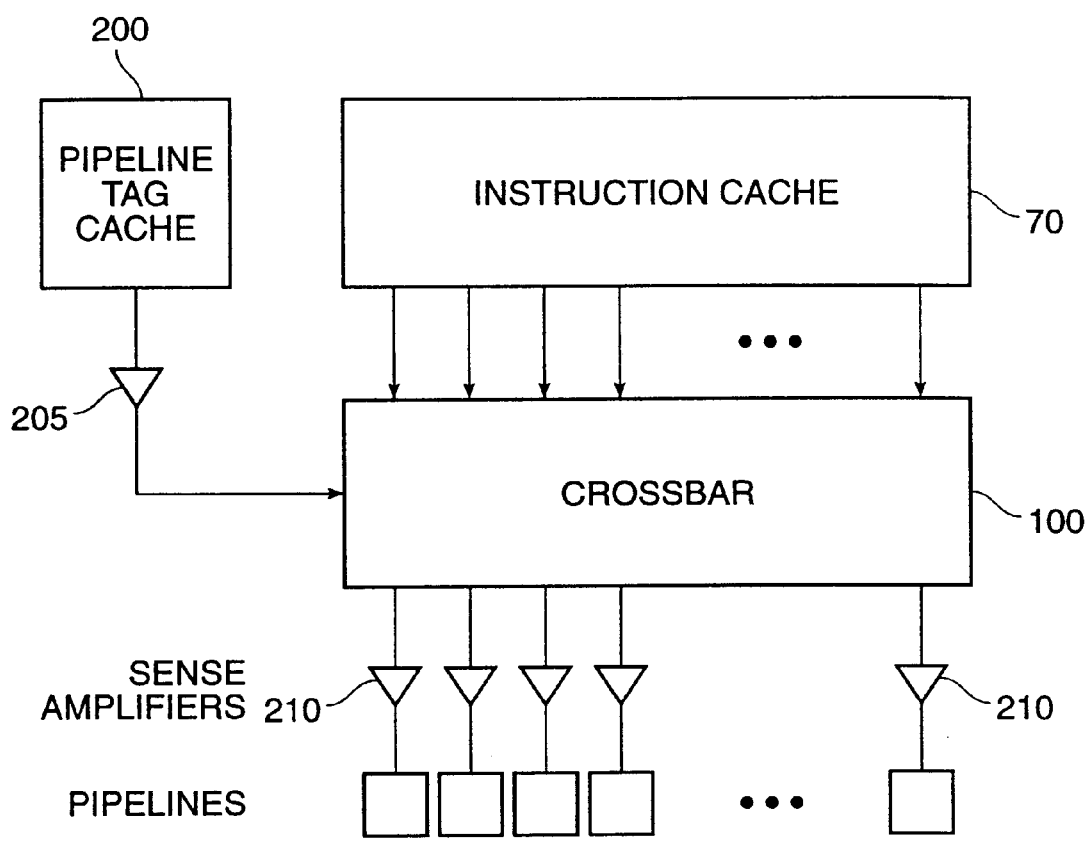
FIG. 5 is a diagram illustrating another embodiment of the associative crossbar.

FIG. 2 is a simplified diagram illustrating the secondary cache, the predecoder, and the instruction cache. This figure, as well as FIGS. 3, 4 and 5, are used to explain the manner in which the instructions tagged with the pipeline identifier are routed to their designated instruction pipelines.

In FIG. 2, for illustration, assume that groups of instructions to be executed in parallel are fetched in a single transfer across a 256 bit (32 byte) wide path from a secondary cache 50 into the predecoder 60. As explained above, the predecoder prefixes the pipeline "P" field to the instruction. After predecoding the resulting set of instructions is transferred into the primary instruction cache 70. At the same time, a tag is placed into the tag field 74 for that line.

In the preferred embodiment the instruction cache operates as a conventional physically-addressed instruction cache. In the example depicted in FIG. 2, the instruction cache will contain 512 bit sets of instructions of eight instructions each, organized in two compartments of 256 lines.

Address sources for the instruction cache arrive at a multiplexer 80 that selects the next address to be fetched. Because preferably instructions are always machine words, the low order two address bits <1:0> m of the 32 bit address field supplied to multiplexer 80 are discarded. These two bits designate byte and half-word boundaries. Of the remaining 30 bits, the next three low order address bits <4:2>, which designate a particular instruction word in the set, are sent directly via bus 81 to the associative crossbar. The next low eight address bits <12:5> are supplied over bus 82 to the instruction cache 70 where they are used to select one of the 256 lines in the instruction cache. Finally, the remaining 19 bits of the virtual address <31:13> are sent to the translation lookaside buffer (TLB) 90. The TLB translates these bits into the high 19 bits of the physical address. The TLB then supplies them over bus 84 to the instruction cache. In the cache they are compared with the tag of the selected line, to determine if there is a "hit" or a "miss" in the instruction cache.

If there is a hit in the instruction cache, indicating that the addressed instruction is present in the cache, then the selected set of instructions is transferred across the 512 bit wide bus 73 into the associative crossbar 100. The associative crossbar 100 then dispatches the addressed instructions to the appropriate pipelines over buses 110, 111, . . . , 117. Preferably the bit lines from the memory cells storing the bits of the instruction are themselves coupled to the associative crossbar. This eliminates the need for numerous sense amplifiers, and allows the crossbar to operate on the lower voltage swing information from the cache line directly, without the normally intervening driver circuitry to slow system operation.

FIG. 3 illustrates in more detail one embodiment of the associative crossbar. A 512 bit wide register 130, which represents the memory cells in a line of the cache (or can be a physically separate register), contains at least the set of instructions capable of being issued. For the purposes of illustration, register 130 is shown as containing up to eight instruction words W0 to W7. Using means described in the copending application referred to above, the instructions have been sorted into groups for parallel execution. For illustration here, assume the instructions in Group 1 are to be dispatched to pipelines 1, 2 and 3; the instructions in Group 2 to pipelines 1, 3 and 6; and the instructions in Group 3 to pipelines 1 and 6. The decoder select signal enables only the appropriate set of instructions to be executed in parallel, essentially allowing register 130 to contain more than just one set of instructions. Of course, by only using register 130 only for one set of parallel instructions at a time, the decoder select signal is not needed.

As shown in FIG. 3, the crossbar switch itself consists of two sets of crossing pathways. In the horizontal direction are the pipeline pathways 180, 181, . . . , 187. In the vertical direction are the instruction word paths, 190, 191, . . . , 197. Each of these pipeline and instruction pathways is themselves a bus for transferring the instruction word. Each horizontal pipeline pathway is coupled to a pipeline execution unit 200, 201, 202, 207. Each of the vertical instruction word pathways 190, 191, . . . , 197 is coupled to an appropriate portion of register or cache line 130.

The decoders 170, 171, . . . , 177 associated with each instruction word pathway receive the 4 bit pipeline code from the instruction. Each decoder, for example decoder 170, provides eight 1 bit control lines as output. One of these control lines is associated with each pipeline pathway crossing of that instruction word pathway. Selection of a decoder as described with reference to FIG. 3 activates the output bit control line corresponding to that input pipe number. This signals the crossbar to close the switch between the word path associated with that decoder and the pipe path selected by that bit line. Establishing the cross connection between these two pathways causes a selected instruction word to flow into the selected pipeline. For example, decoder 173 has received the pipeline bits for word W3. Word W3 has associated with it pipeline path 1. The pipeline path 1 bits are decoded to activate switch 213 to supply instruction word W3 to pipeline execution unit 201 over pipeline path 181. In a similar manner, the identification of pipeline path 3 for decoder D4 activates switch 234 to supply instruction word W4 to pipeline path 3. Finally, the identification of pipeline 6 for word W5 in decoder D5 activates switch 265 to transfer instruction word W5 to pipeline execution unit 206 over pipeline pathway 186. Thus, instructions W3, W4 and W5 are executed by pipes 201, 203 and 206, respectively.

The pipeline processing units 200, 201, . . . , 207 shown in FIG. 3 can carry out desired operations. In a preferred embodiment of the invention, each of the eight pipelines first includes a sense amplifier to detect the state of the signals on the bit lines from the crossbar. In one embodiment the pipelines include first and second arithmetic logic units; first and second floating point units; first and second load units; a store unit and a control unit. The particular pipeline to which a given instruction word is dispatched will depend upon hardware constraints as well as data dependencies.

FIG. 4 is a diagram illustrating another embodiment of the associative crossbar. In FIG. 4 nine pipelines 0–8 are shown coupled to the crossbar. The decode select is used to enable a subset of the instructions in the register 130 for execution just as in the system of FIG. 3.

The execution ports that connect to the pipelines specified by the pipeline identification bits of the enabled instructions are then selected to multiplex out the appropriate instructions from the contents of the register. If one or more of the pipelines is not ready to receive a new instruction, a set of hold latches at the output of the execution ports prevents any of the enabled instructions from issuing until the "busy" pipeline is free. Otherwise the instructions pass transparently through the hold latches into their respective pipelines. Accompanying the output of each port is a "port valid" signal that indicates whether the port has valid information to issue to the hold latch. FIG. 5 illustrates an alternate embodiment for the invention where pipeline tags are not included with the instruction, but are supplied separately, or where the cache line itself is used as the register for the crossbar. In these situations, the pipeline tags may be placed into a high speed separate cache memory 200. The output from this memory can then control the crossbar in the same manner as described in conjunction with FIG. 3. This approach eliminates the need for sense amplifiers between the instruction cache and the crossbar. This enables the crossbar to switch very low voltage signals more quickly than higher level signals, and the need for hundreds of sense amplifiers is eliminated. To provide a higher level signal for control of the crossbar, sense amplifier 205 is placed between the pipeline tag cache 200 and the crossbar 100. Because the pipeline tag cache is a relatively small memory, however, it can operate more quickly than the instruction cache memory, and the tags therefore are available in time to control the crossbar despite the sense amplifier between the cache 200 and the crossbar 100. Once the switching occurs in the crossbar, then the signals are amplified by sense amplifiers 210 before being supplied to the various pipelines for execution.

The architecture described above provides many unique advantages to a system using this crossbar. The crossbar described is extremely flexible, enabling instructions to be executed sequentially or in parallel, depending entirely upon the "intelligence" of the compiler. Importantly, the associative crossbar relies upon the content of the message being decoded, not upon an external control circuit acting independently of the instructions being executed. In essence, the associative crossbar is self directed.

Another important advantage of this system is that it allows for more intelligent compilers. Two instructions which appear to a hardware decoder (such as in the prior art described above) to be dependent upon each other can be determined by the compiler not to be interdependent. For example, a hardware decoder would not permit two instructions R1+R2=R3 and R3+R5=R6 to be executed in parallel. A compiler, however, can be "intelligent" enough to determine that the second R3 is a previous value of R3, not the one calculated by R1+R2, and therefore allow both instructions to issue at the same time. This allows the software to be more flexible and faster.

Although the foregoing has been a description of the preferred embodiment of the invention, it will be apparent to those of skill in the art the numerous modifications and variations may be made to the invention without departing from the scope as described herein. For example, arbitrary numbers of pipelines, arbitrary numbers of decoders, and different architectures may be employed, yet rely upon the system we have developed.

What is claimed is:

1. In a computing system having a plurality of processing pipelines in which groups of individual instructions, within a very long instruction word, are executable by the plurality of processing pipelines, individual instructions in the very long instruction word to be executed having associated therewith group identifiers and pipeline identifiers, an apparatus for routing each individual instruction of a group of individual instructions to be executed in parallel to an appropriate processing pipeline of the plurality of processing pipelines, the apparatus comprising:

a main memory for storing the very long instruction word;

a very long instruction word storage coupled to the main memory, for receiving the very long instruction word from the main memory and for holding the very long instruction word the very long instruction word including groups of instructions to be executed in parallel, including pipeline identifiers and group identifiers;

a selection circuit coupled to the very long instruction word storage for receiving the group identifiers included in the very long instruction word, for determining in response thereto a group of individual instructions to be executed in parallel, and for outputting a control signal;

a decoder circuit coupled to the selection circuit and to the very long instruction word storage, for receiving the control signal and the pipeline identifiers included in the very long instruction word, for determining in response thereto the appropriate processing pipeline for each individual instruction of the group, and for outputting switch control signals;

a switching circuit coupled to the decoder circuit, having a first set of connectors coupled to the very long instruction word storage for receiving the very long instruction word therefrom and a second set of connectors coupled to the plurality of processing pipelines, for coupling each individual instruction of the group to an appropriate processing pipeline in response to the switch control signals.

2. The apparatus of claim 1, wherein the first set of connectors comprises a set of first communication buses, one first communication bus for each individual instruction held in the very long instruction word storage;

wherein the second set of connectors comprises a set of second communication buses, one second communication bus for each processing pipeline;

wherein the decoder circuit comprises a set of decoders coupled to receive as first input signals the pipeline identifiers and as second input signals the pipeline identifiers; and wherein the switching circuit comprises a set of switches, one switch for every intersection between each of the first set of connectors and each of the second set of connectors, each switch for providing connections, in response to receiving the switch control signals, between each individual instruction in the group to be executed in parallel to the appropriate processing pipeline.

3. The apparatus of claim 2 wherein the selection means comprises a multiplexer coupled to receive the group identifiers for each individual instruction in the very long instruction word storage, and in response to the group identifiers, enable the decoder means to output switch control signals for each individual instructions of the group.

4. The apparatus of claim 3, wherein the multiplexer supplies a switch control signal to the decoder means to enable the decoder means to output switch control signals for each individual instruction of the group of individual instructions from the very long instruction word.

5. In a computing system having a plurality of processing pipelines in which groups of individual instructions are executable, each individual instruction in a group executable in parallel by the plurality of processing pipelines, a method for transferring each individual instruction in a group to be executed through a switching unit having a first set of connectors coupled to a very long instruction word storage for receiving individual instructions therefrom, a second set of connectors coupled to the plurality of processing pipelines, and switches between the first set and the second set of connectors, the method comprising:

retrieving the very long instruction word from a main memory;

storing in the very long instruction word storage, the very long instruction word; the very long instruction word having a set of individual instructions including at least one group of individual instructions to be executed in parallel, individual instructions in the at least one group having associated therewith pipeline identifiers indicative of the processing pipeline which will execute that individual instruction, the very long instruction word storage also including at least one other individual instruction not in the at least one group of individual instructions, the at least one other individual instruction also having associated therewith the pipeline identifiers; and using the pipeline identifiers to control the switches between the first set of connectors and the second set of connectors to thereby supply each individual instruction in the at least one group to be executed in parallel to an appropriate processing pipeline at a time different from when the at least one other individual instruction is supplied to an appropriate processing pipeline.

6. A method as in claim 5 wherein the step of using the pipeline identifiers comprises:

supplying the pipeline identifiers to individual decoders of a set of decoders, each decoder of which provides an output signal; and using the output signals of the sets of decoders to control the switches between the first set of connectors and the second set of connectors to thereby supply each individual instruction in the at least one group to be executed in parallel to an appropriate processing pipeline.

7. A method as in claim 6 wherein individual instructions in the storage further includes group identifiers associated therewith to designate among the instructions present in the very long instruction word storage, which of the individual instructions may be simultaneously supplied to the plurality of processing pipelines, and the method further comprises:

supplying a group of instructions to be executed by the processing pipelines together with the group identifiers to a selector;

using the group identifiers to provide output determination signals; and using both the output determination signals and the output signals to control the switches between the first set of connectors and the second set of connectors to thereby supply each instruction in the at least one group to be executed in parallel to the appropriate processing pipeline.

8. In a computing system having a plurality of processing pipelines in which groups of individual instructions are executable by the plurality of processing pipelines, a method for supplying each individual instruction in a group of individual instructions to be executed in parallel to an appropriate processing pipeline, the method comprising:

retrieving a very long instruction word from a main memory;

storing in a very long instruction word storage the very long instruction word retrieved from the main memory, the very long instruction word including groups of individual instructions to be executed in parallel, the individual instructions having associated therewith pipeline identifiers indicative of processing pipelines which will execute the individual instructions and having associated therewith group identifiers indicative of a group identification;

comparing the group identifiers to an execution group identifier of those instructions to be next executed in parallel; and using the pipeline identifiers to control switches in a switch having a first set of connectors coupled to the very long instruction word storage for receiving the very long instruction word therefrom and a second set of connectors coupled to the plurality of processing pipelines to thereby supply each individual instruction in the at least one group to be executed in parallel to the appropriate processing pipeline.

9. A computing system comprising:

a compiler for forming groups of instructions having opcodes including a first group of instructions and a second group of instructions, instructions in the first group of instructions executable in parallel, and instructions in the second group of instructions executable in parallel;

a first memory storage having at least a memory location, the memory location for storing the first group of instructions, for storing the second group of instructions comprising at least one instruction, and for storing group identifiers that indicate which instructions are included within the first group of instructions and which instructions are included within the second group of instructions;

a pre-decoder coupled to the first memory storage for decoding opcodes of instructions in the first group of instructions and opcodes of instructions in the second group of instructions, for forming a first group of expanded instructions, a second group of expanded instructions, and expanded group identifiers, and for determining processing pipeline identifiers associated with expanded instructions in the first group of expanded instructions and processing pipeline identifiers associated with expanded instructions in the second group of expanded instructions, in response thereto;

a second memory storage coupled to the predecoder having at least a memory location, the memory location for storing the first group of expanded instructions, the second group of expanded instructions, the expanded group identifiers, the processing pipeline identifiers associated with the expanded instructions in the first group of expanded instructions, and the processing pipeline identifiers associated with the expanded instructions in the second group of expanded instructions;

a decoder coupled to the second memory storage for receiving the first group of expanded instructions, the second group of expanded instructions, and the expanded group identifiers, and for issuing the first group of expanded instructions in response to the expanded group identifiers;

a plurality of processing pipelines;

a crossbar coupled to the decoder and to the plurality of processing pipelines, for issuing expanded instructions in the first group of expanded instructions to processing pipelines of the plurality of processing pipelines in response to the processing pipeline identifiers associated with the expanded instructions in the first group of expanded instructions.

10. The computing system of claim 9 wherein a first processing pipeline identifier from the processing pipeline identifiers associated with the expanded instructions in the first group of expanded instructions identifies a first floating point unit pipeline.

11. The computing system of claim 10 wherein a second processing pipeline identifier from the processing pipeline identifiers associated with the expanded instructions in the first group of expanded instructions identifies a first arithmetic logic unit pipeline.

12. The computing system of claim 10 wherein a second processing pipeline identifier from the processing pipeline identifiers associated with the expanded instructions in the first group of expanded instructions identifies a second floating point unit pipeline.

13. The computing system of claim 11 wherein a third processing pipeline identifier from the processing pipeline identifiers associated with the expanded instructions in the first group of expanded instructions identifies a second floating point unit pipeline.

14. The computing system of claim 9 wherein a first processing pipeline identifier from the processing pipeline identifiers associated with the expanded instructions in the second group of expanded instructions identifies a store unit pipeline.

15. The computing system of claim 14 wherein a second processing pipeline identifier from the processing pipeline identifiers associated with the expanded instructions in the second group of expanded instructions identifies a control unit pipeline.

16. The computing system of claim 9
wherein the decoder is also for issuing the second group of expanded instructions in response to the expanded group identifiers; and
wherein the crossbar is also for issuing expanded instructions in the second group of expanded instructions to processing pipelines of the plurality of processing pipelines in response to the processing pipeline identifiers associated with the expanded instructions in the second group of expanded instructions.

17. The computing system of claim 9 wherein the group identifiers are associated with instructions in the first group of instructions and with instructions in the second group of instruction.

18. The computing system of claim 17 wherein the group identifiers are embedded with instructions in the first group of instructions and with instructions in the second group of instruction.

19. The computing system of claim 9 wherein the first group of expanded instructions comprises at least one expanded instruction and the second group of expanded instructions comprises at least two expanded instructions.

20. The computing system of claim 19 wherein the second memory storage includes at least the two expanded instructions of the second group of expanded instructions and the one expanded instruction of the first group of expanded instructions.

21. The computing system of claim 9
wherein the compiler is also for forming a third group of instructions, the instructions in the third group of instructions executable in parallel;
wherein the memory location of the first memory storage is also for storing a third group of instructions in parallel with the first group of instructions and the second group of instructions; and
wherein the group identifiers indicate which instructions are included within the third group of instructions.

22. The computing system of claim 21 wherein the third group of instructions comprises at least one instruction.

23. The computing system of claim 9 wherein the first memory storage is a superscaler cache.

24. The computing system of claim 9 wherein one expanded instruction of the second group of expanded instructions is a branch instruction.

25. The computing system of claim 9 wherein the compiler explicitly identifies instructions that can be performed in parallel for the first group of instructions.

26. A method for issuing groups of individual software-scheduled instructions in parallel for processing comprises:

forming a first group of software-scheduled instructions, a second group of software-scheduled instructions comprising at least one instruction, and group identifiers indicating which software-scheduled instructions are included within the first group of software-scheduled instructions and which software-scheduled instructions are included within the second group of software-scheduled instructions, software-scheduled instructions in the first group of software-scheduled instructions having opcodes and executable in parallel, and software-scheduled instructions in the second group of software-scheduled instructions having opcodes and executable in parallel;

storing the first group of software-scheduled instructions, the second group of software-scheduled instructions, and the group identifiers in parallel in a first memory location;

forming a first group of expanded software-scheduled instructions, a second group of expanded software-scheduled instructions, and expanded group identifiers in response to opcodes of software-scheduled instructions in the first group of software-scheduled instructions and opcodes of software-scheduled instructions in the second group of software-scheduled instructions;

determining processing pipelines appropriate for expanded software-scheduled instructions in the first group of expanded software-scheduled instructions and processing pipelines appropriate for expanded software-scheduled instructions in the second group of expanded software-scheduled instructions also in response to the opcodes of software-scheduled instructions in the first group of software-scheduled instructions and the opcodes of software-scheduled instructions in the second group of software-scheduled instructions; and issuing the first group of expanded software-scheduled instructions to the processing pipelines appropriate for expanded software-scheduled instructions in the first group of expanded software-scheduled instructions, in response to the expanded group identifiers.

27. The method of claim 26 further comprising:
issuing the second group of expanded software-scheduled instructions to the processing pipelines appropriate for expanded software-scheduled instructions in the second group of expanded software-scheduled instructions, in response to the expanded group identifiers.

28. The method of claim 26 wherein a first processing pipeline appropriate for an expanded software-scheduled instruction in the first group of expanded software-scheduled instructions is coupled to a first arithmetic logic processing unit.

29. The method of claim 28 wherein a second processing pipeline appropriate for an expanded software-scheduled instruction in the first group of expanded software-scheduled instructions is coupled to a first floating point processing unit.

30. The method of claim 28 wherein a second processing pipeline appropriate for an expanded software-scheduled instruction in the first group of expanded software-scheduled instructions is coupled to a second arithmetic logic processing unit.

31. The method of claim 29 wherein a third processing pipeline appropriate for an expanded software-scheduled instruction in the first group of expanded software-scheduled instructions is coupled to a second arithmetic logic processing unit.

32. The method of claim 28 wherein a second processing pipeline appropriate for an expanded software-scheduled instruction in the first group of expanded software-scheduled instructions is coupled to a load unit.

33. The method of claim 26 wherein a first processing pipeline appropriate for an expanded software-scheduled instruction in the second group of expanded software-scheduled instructions is coupled to a store unit.

34. The method of claim 33 wherein a second processing pipeline appropriate for an expanded software-scheduled instruction in the second group of expanded software-scheduled instructions is coupled to a control unit.

35. The method of claim 26 further comprises:
storing the first group of expanded software-scheduled instructions, the second group of expanded software-scheduled instructions, and the expanded group identifiers, in a second memory location;
wherein the step of issuing the first group of expanded software-scheduled instructions comprises issuing the first group of expanded software-scheduled instructions and the second group of expanded software-scheduled instructions from the second memory location to a decoder; and
issuing the first group of expanded software-scheduled instructions to the processing pipelines appropriate for the expanded software-scheduled instructions in the first group of expanded software-scheduled instructions from the decoder in response to the expanded group identifiers stored in the second memory location.

36. The method of claim 35 further comprises:
issuing the second group of expanded software-scheduled instructions to the processing pipelines appropriate for the expanded software-scheduled instructions in the second group of expanded software-scheduled instructions from the decoder in response to the expanded group identifiers stored in the second memory location.

37. The method of claim 36 wherein the processing pipelines appropriate for the expanded software-scheduled instructions in the first group of expanded software-scheduled instructions are identified by processing pipeline identifiers.

38. The method of claim 37 wherein the step of storing the first group of expanded software-scheduled instructions further comprises storing the processing pipeline identifiers in the second memory location.

39. The method of claim 38 wherein the step of issuing the first group of expanded software-scheduled instructions to the processing pipelines comprises issuing the first group of expanded software-scheduled instructions to a crossbar.

40. The method of claim 39 wherein the crossbar is an associative crossbar responsive to the processing pipeline identifiers.

41. The method of claim 35 wherein the first group of expanded instructions comprises at least two expanded instructions.

42. The method of claim 41 wherein the second group of expanded instructions comprises at least one expanded instruction.

43. The method of claim 42 wherein the two expanded instructions of the first group of expanded instructions and the one expanded instruction of the second group of expanded instructions are stored in the second memory location.

44. The method of claim 26 wherein the step of forming the first group of software-scheduled instructions, the second group of software-scheduled instructions, and the group identifiers comprises using a compiler to form the first group of software-scheduled instructions, the second group of software-scheduled instructions, and the group identifiers.

45. The method of claim 44 wherein the group identifiers are associated with instructions in the first group of instructions and with instructions in the second group of instruction.

46. The method of claim 44 wherein the compiler explicitly determines parallel executable instructions among a plurality of instructions to include in the first group of software-scheduled instructions.

47. The method of claim 26 wherein the step of forming the first group of software-scheduled instructions, the second group of software-scheduled instructions, and the group identifiers further comprises the step of forming a third group of software-scheduled instructions executable in parallel; and
wherein the group identifiers also indicate which software-scheduled instructions are included within the third group of software-scheduled instructions.

48. The method of claim 26 wherein the first memory location is a cache location in a superscaler cache.

49. A method for issuing a group of individual instructions in parallel for processing comprises:
storing in parallel a plurality of instructions and instruction grouping information in a location in a memory, the plurality of instructions and the instruction grouping information determined by a compiler, the instruction grouping information indicating which instructions of the plurality of instructions belong to a first group of instructions and can be issued in parallel, and indicating at least another instruction of the plurality of instructions that can be issued after the first group of instructions;
issuing the first group of instructions in response to the instruction grouping information; and
coupling instructions in the first group of instructions to instruction pipelines appropriate for the instructions in the first group of instructions.

50. The method of claim 49 further comprises
after coupling instructions in the first group of instructions, issuing the at least another instruction in response to the instruction grouping information; and
coupling the at least another instruction to an instruction pipeline appropriate for the at least another instruction.

51. The method of claim 50 wherein the instruction grouping information also indicates which instructions of the plurality of instructions belong to a second group of instructions and can be issued in parallel after the at least another instruction.

52. The method of claim 49
wherein the instructions in the first group of instructions include instruction types; and
wherein coupling instructions in the first group of instructions further comprises determining the instruction pipelines appropriate for the instructions in the first group of instructions in response to the instruction types.

53. The method of claim 52 wherein the instruction types comprise opcodes.

54. The method of claim 50 wherein issuing the first group of instructions further comprises receiving the first group of instructions, the at least another instruction, and the instruction grouping information from the location in the memory.

55. The method of claim 50 wherein the first group of instructions comprises at least two instructions.

56. The method of claim 50 wherein the first group of instructions comprises at least one instruction.

57. The method of claim 55 wherein an instruction frame comprises the plurality of instructions and instruction grouping information, and wherein the instruction frame includes at least the two instructions of the first group of instructions and the at least another instruction.

58. The method of claim 50 wherein the compiler explicitly identifies parallel executable instructions from the plurality of instructions.

59. The method of claim 52 wherein the instruction types comprise pipeline identifiers that identify the instruction pipelines appropriate for the instructions in the first group of instructions.

60. The method of claim 59 wherein the pipeline identifiers are determined by the compiler.

61. The method of claim 60 wherein coupling instructions in the first group of instructions comprises using a crossbar switch to couple the instructions in the first group of instructions to the instruction pipelines appropriate for the instructions in the first group of instructions in response to the pipeline identifiers.

62. The method of claim 50 wherein the memory is a cache and the location is a cache entry.

63. A computing system comprising:

a cache including a plurality of cache entries, a cache entry of the plurality of cache entries configured to store in parallel a plurality of software-scheduled instructions and instruction grouping information, the instruction grouping information configured to identify a first group of software-scheduled instructions from the plurality of software-scheduled instructions and to identify at least another software-scheduled instruction from the plurality of software-scheduled instructions, the at least another software-scheduled instruction to be issued after instructions in the first group of software-scheduled instructions.

64. The computing system of claim 63 wherein the instruction grouping information is also configured to identify a second group of software-scheduled instructions from the plurality of software-scheduled instructions, instructions in the second group of software-scheduled instructions to be issued after at least another software-scheduled instruction.

65. The computing system of claim 63 wherein the cache is also configured to issue the first group of software-scheduled instructions, the at least another software-scheduled instruction, and the instruction grouping information;

the computing system further comprising a group decoder coupled to the cache and configured to receive the first group of software-scheduled instructions, the at least another software-scheduled instruction, and the instruction grouping information, and to issue the first group of software-scheduled instructions in response to the instruction grouping information.

66. The computing system of claim 65 wherein the group decoder is also configured to issue the at least another software-scheduled instruction, after the first group of software-scheduled instructions in response to the instruction grouping information.

67. The computing system of claim 65 wherein each instruction in the first group of software-scheduled instructions includes an instruction type, the computing system further comprising an instruction decoder coupled to the cache and configured to receive the instruction types of the instructions in the first group of software-scheduled instructions and to determine instruction pipelines appropriate for each of the instructions in the first group of software-scheduled instructions.

68. The computing system of claim 67 wherein the instruction type comprises an opcode, and the instruction decoder comprises an opcode decoder.

69. The computing system of claim 67 further comprising:

a pipeline coupler coupled to the group decoder and to the instruction decoder and configured to receive the first group of software-scheduled instructions and configured to couple each instruction in the first group of software-scheduled instructions to the instruction pipelines appropriate for the instructions in the first group of software-scheduled instructions.

70. The computing system of claim 69 wherein the pipeline coupler is a crossbar switch.

71. The computing system of claim 65 wherein the first group of software-scheduled instructions comprises at least two instructions.

72. The computing system of claim 71 wherein the first group of software-scheduled instructions comprises at least one instruction.

73. The computing system of claim 72 wherein an instruction frame comprises the plurality of software-scheduled instructions and instruction grouping information; and wherein the instruction frame includes at least the two instructions of the first group of software-schedule instructions and the at least another software-scheduled instruction.

74. The computing system of claim 63 wherein the cache is a superscaler cache.

75. The computing system of claim 63 wherein a compiler explicitly identifies parallel executable instructions from the plurality of software-scheduled instructions that form the first group of software-scheduled instructions.

76. The computing system of claim 67 wherein the instruction types comprise pipeline identifiers indicative of instruction pipelines appropriate for the instructions in the first group of software-scheduled instructions.

77. The method of claim 49 wherein the instruction grouping information also indicates instruction pipelines appropriate for the instructions in the first group of instructions; and wherein coupling instructions in the first group of instructions to the instruction pipelines appropriate for the instructions in the first group of instructions is in response to the instruction grouping information.

78. The method of claim 77 wherein the instruction grouping information also indicates instruction pipelines appropriate for the instructions in the second group of instructions.

79. The computing system of claim 65 further comprising an switching unit coupled to the cache and configured to receive the instructions in the first group of software-scheduled instructions and to couple the instructions in the first group of software-scheduled instructions to instruction pipelines appropriate for each of the instructions in the first group of software-scheduled instructions in response to the instruction grouping information.

80. The computing system of claim 79 wherein the switching unit is also configured to receive the at least another software-scheduled instruction and to couple the at least another software-scheduled instruction to an instruction pipeline appropriate the at least another software-scheduled instruction in response to the instruction grouping information.

81. A computing system in which instructions are issued in parallel to processing pipelines, the computing system comprising:

a storage configured to store an instruction frame, the instruction frame including a plurality of instructions including a group of instructions and at least another instruction in parallel, instructions in the group of instructions to be issued in parallel, the at least another instruction to be issued at a time different from a time when the group of instructions is to be issued, the instruction frame also including data associated with the plurality of instructions, the data associated with the plurality of instructions indicative of which instructions in the plurality of instructions are included in the group of instructions, the data associated with the plurality of instructions also indicative of processing pipelines appropriate for the plurality of instructions, and the data associated with the plurality of instructions determined at a compile time; and a switching circuit coupled to the storage, configured to issue the instructions in the group of instructions in parallel, to processing pipelines appropriate for the instructions in the group of instructions, in response to the data associated with the plurality of instructions.

82. The computing system of claim 81 wherein the group of instructions comprises at least two instructions.

83. The computing system of claim 81 wherein the group of instructions comprises one instruction.

84. The computing system of claim 81 wherein the switching circuit is also configured to issue the at least another instruction to a processing pipeline appropriate for the at least another instruction in response to the data associated with the plurality of instructions.

85. The computing system of claim 81 wherein the processing pipelines appropriate for the instructions in the group of instructions are respectively coupled to execution units appropriate for the instructions in the group of instructions.

86. The computing system of claim 85 wherein an execution unit appropriate for a first instruction in the group of instructions is a memory.

87. The computing system of claim 86 wherein an execution unit appropriate for a second instruction in the group of instructions is an arithmetic logic unit.

88. The computing system of claim 86 wherein an execution unit appropriate for a second instruction in the group of instructions is a floating point unit.

89. The computing system of claim 85 wherein an execution unit appropriate for one instruction in the group of instructions is a branch unit.

90. The computing system of claim 85 wherein a type of execution unit appropriate for a first instruction in the group of instructions and a type of execution unit appropriate for a second instruction in the one group of instructions are similar.

91. The computing system of claim 81 wherein the plurality of instructions in the instruction frame are determined at the compile time.

92. A method for issuing groups of instructions in parallel to processing pipelines, the method comprising:

storing in a storage, an instruction frame, the instruction frame including a plurality of instructions including a group of instructions and at least another instruction in parallel, instructions in the group of instructions to be issued in parallel, the at least another instruction to be issued at a time different from a time when the group of instructions is to be issued, the instruction frame also including data associated with the plurality of instructions, the data associated with the plurality of instructions indicative of which instructions are included in the group of instructions, the data associated with the instructions also indicative of processing pipelines appropriate for the plurality of instructions, and the data associated with the plurality of instructions determined at compile time; and issuing the instructions in the group of instructions in parallel to processing pipelines appropriate for the instructions in the group of instructions, in response to the data associated with the plurality of instructions.

93. The method of claim 92 further comprising:

during compile time, determining the plurality of instructions in the instruction frame.

94. The method of claim 92 wherein the group of instructions comprises at least two instructions.

95. The method of claim 94 further comprising, before issuing the group of instructions, issuing the at least another instruction to a processing pipeline appropriate for the at least another instruction in response to the data associated with the plurality of instructions.

96. The method of claim 92 wherein the processing pipelines appropriate for the instructions in the group of instructions are respectively coupled to execution units appropriate for the instructions in the group of instructions.

97. The method of claim 96 wherein a type of execution unit appropriate for a processing pipeline appropriate for a first instruction in the group of instructions is an arithmetic logic unit.

98. The method of claim 97 wherein a type of execution unit appropriate for a processing pipeline appropriate for a second instruction in the group of instructions is an arithmetic logic unit.

99. The method of claim 96 wherein a type of execution unit appropriate for a processing pipeline appropriate for a first instruction in the group of instructions is a floating point unit.

100. The method of claim 96 wherein a type of execution unit appropriate for a processing pipeline appropriate for a first instruction in the group of instructions is a memory unit and a type of execution unit appropriate for a processing pipeline appropriate for a second instruction in the group of instructions is a memory unit.

101. A method of operating a microprocessor comprises:

compiling computer code to determine a frame of instructions;

storing in a memory storage the frame of instructions, the frame of instructions including a plurality of instructions and issue data, the plurality of instructions including at least a first instruction, a second instruction, and a third instruction, the issue data comprising data indicating that the first instruction is to be issued before the second instruction and the third instruction and that the second and third instructions are to be issued in parallel, and the issue data indicating respective processing units appropriate for the first instruction, the second instruction, and the third instruction; and issuing the first instruction to a processing unit appropriate for the first instruction in response to the issue data; and issuing the second instruction and the third instruction in parallel to respective processing units appropriate for the second instruction and the third instruction in response to the issue data.

102. The method of claim 101 wherein the processing unit appropriate for the first instruction is a memory unit.

103. The method of claim 102 wherein a processing unit appropriate for the second instruction is a memory unit.

104. The method of claim 102 wherein a processing unit appropriate for the second instruction is an arithmetic logic unit.

105. The method of claim 101 wherein issuing the first instruction to a processing unit comprises using a switching unit to couple the first instruction to the processing unit appropriate for the first instruction in response to the issue data.

106. A computing system having a plurality of processing pipelines for executing groups of individual instructions, within very long instruction words, each individual instruction to be executed in each group being executed by different processing pipelines in parallel, the computing system comprising:

a main memory for storing a very long instruction word;

a very long instruction word storage, coupled to the main memory, for receiving the very long instruction word from the main memory, and for holding the very long instruction word, the very long instruction word including a predetermined number N of individual instructions, and including at least one group of M individual instructions to be executed in parallel, where M<=N, each individual instruction in the very long instruction word storage to be executed having an a pipeline identifier indicative of a processing pipeline for executing the individual instruction, and having a group identifier indicative of a group of individual instructions to which the individual instruction is assigned for execution in parallel;

instruction in a group decoder responsive to the group identifier for each individual instruction in the very long instruction word storage to be executed for enabling each individual instruction in the very long instruction word storage having a similar group identifier, to be executed in parallel by the plurality of processing pipelines; and a pipeline decoder responsive to the pipeline identifier of each individual instructions in the very long instruction word storage to be executed for causing each individual instruction in a group of individual instructions having the similar group identifier to be supplied to the different processing pipelines.

107. The computing system of claim 106 wherein M is greater than or equal to 1.

108. The computing system of claim 106 wherein M is greater than 1.

109. The computing system in claim 106, wherein the very long instruction word storage includes the at least one group of M individual instructions, and also includes group identifiers and pipeline identifiers for each individual instruction in the at least one group of M individual instructions.

110. The computing system in claim 107, wherein each individual instruction in the at least one group of M individual instructions has associated therewith a different pipeline identifier.

111. The computing system of claim 106, wherein the very long instruction word storage holds a first group of individual instructions to be executed in parallel and a second group of individual instructions to be executed in parallel after the first group, each individual instruction in the first group having associated therewith a first group identifier different from a second group identifier associated with each individual instruction in the second group, the first group and the second group being placed adjacent to each other in the very long instruction word storage.

112. The computing system of claim 111 wherein:

the very long instruction word storage comprises a line in a cache memory having a fixed number of storage locations; and the first group of individual instructions is placed at one end of the line in the cache memory, and the second group of individual instructions is placed next to the first group of individual instructions.

113. A method of executing in a plurality of processing pipelines arbitrary numbers of instructions in a stream of instructions in parallel which have been compiled to determine which instructions can be executed in parallel, the method comprising:

in response to the compilation, assigning a common group identifier to a group of instructions which can be executed in parallel;

determining a processing pipeline for execution of each instruction in the group of instructions to be executed;

assigning a pipeline identifier to each instruction in the group;

associating the common group identifier and the pipeline identifier with the group of instructions;

forming a very long instruction word with a fixed number of the instructions including at least the group of instructions and the common group identifier as well as at least one other instruction having a different group identifier, the at least one other instruction to be issued at a time different from instructions in the group of instructions; and storing the very long instruction word in a main memory.

114. A method as in claim 113 further comprising:

placing the very long instruction word retrieved from the main memory into a very long instruction word register; and executing the group of instructions in the plurality of processing pipelines in parallel.

115. A method as in claim 114, wherein the very long instruction word register holds at least two groups of instructions; and wherein placing the instructions in the very long instruction word register comprises placing the group of instructions adjacent to the at least one other instruction having the different group identifier in the very long instruction word register.

116. A method as in claim 115 wherein executing the group of instructions in parallel comprises:

coupling the very long instruction word register to a detection means to receive group identifiers associated with each instruction to be executed in the very long instruction word; and supplying only instructions in the group of instructions to the processing pipelines in response to the group identifiers.

117. In a computing system having a plurality of processing pipelines in which groups of individual instructions, within very long instruction words, are executable in parallel by processing pipelines, a method for supplying each individual instruction in a group to be executed in parallel to corresponding appropriate processing pipelines, the method comprising:

retrieving a very long instruction word from a main memory;

storing in a very long instruction word storage the very long instruction word, the very long instruction word including groups of individual instructions to be executed in parallel, the groups of individual instruction to be executed in the very long instruction word having associated therewith pipeline identifiers indicative of the corresponding appropriate processing pipeline which will execute the instructions and group identifiers indicative of groups of instructions;

using the group identifiers in the very long instruction word to identify an execution group; and using the pipeline identifiers to execute each individual instruction in the execution group in the corresponding appropriate processing pipelines.

118. In a computing system having a plurality of processing pipelines in which groups of individual instructions, from a very long instruction word, are executable in parallel by the plurality of processing pipelines, an apparatus for routing each individual instruction in a particular group to be executed in parallel to an appropriate processing pipeline, the apparatus comprising:

a main memory for storing the very long instruction word;

a very long instruction word storage coupled to the main memory, for receiving the very long instruction word from the main memory and for holding the very long instruction word, the very long instruction word including groups of individual instructions, individual instructions to be executed in the very long instruction word storage having associated therewith pipeline identifiers indicative of processing pipelines for executing the individual instructions and also having associated therewith group identifiers to designate groups of individual instructions to which individual instructions are assigned, the groups of individual instructions including at least a first group of individual instructions and at least another individual instruction, the pipeline identifiers and the group identifiers included in the very long instruction word;

a switching circuit having a first set of connectors coupled to the very long instruction word storage and a second set of connectors coupled to the plurality of processing pipelines; and a router coupled to the very long instruction word storage and the switching circuit, responsive to the pipeline identifiers for routing each individual instruction in the first group of individual instructions from connectors of the first set of connectors onto appropriate connectors of the second set of connectors, to thereby supply each individual instruction in the first group of individual instructions to be executed in parallel to the appropriate processing pipeline at a time different from when the at least another individual instruction is supplied to an appropriate processing pipeline.

119. The apparatus of claim 118, wherein the first set of connectors includes a set of first communication buses, one first communication bus for each individual instruction to be executed in the very long instruction word storage;

wherein the second set of connectors includes a set of second communication buses, one second communication bus for each processing pipeline; and wherein the router comprises:

a set of decoders coupled to the very long instruction word storage, the decoders in the set for receiving as input signals the pipeline identifiers included in the very long instruction word storage and in response thereto for supplying as output signals switch control signals corresponding to each individual instruction in the very long instruction word storage; and a set of switches coupled to the set of decoders and to the switching circuit, one switch of the set of switches at each intersection of each of the first set of communication buses with each of the second set of communication buses, each switch for receiving the switch control signals and for providing connections in response to receiving a corresponding switch control signal to thereby supply each individual instruction in the group to be executed in parallel to the appropriate processing pipeline.

120. The apparatus of claim 119 further comprising:

a detection circuit coupled to the very long instruction word storage, for receiving the group identifiers included in the very long instruction word storage to be executed and in response thereto supply a group control signal; and wherein the set of decoders are also coupled to the detection circuit for receiving the group control signal and in response thereto supply the switch control signal for only those individual instructions in the group to be supplied to the plurality of processing pipelines.

121. The apparatus of claim 120, wherein the detection circuit comprises a multiplexer coupled to receive the group identifiers included in the very long instruction word storage and in response thereto allow the group of individual instructions to be supplied to the plurality of processing pipelines.

122. Apparatus as in claim 121 wherein the multiplexer supplies output signals to the set of decoders to indicate the group of individual instructions to be next supplied to the plurality of processing pipelines.

* * * * *